United States Patent [19]

Bauer

[11] Patent Number: 4,536,066
[45] Date of Patent: Aug. 20, 1985

[54] ADJUSTABLE MOUNTINGS FOR A MOVIE CAMERA

[76] Inventor: Fritz Bauer, Loquaiplatz 13/26, A-1060 Vienna, Austria

[21] Appl. No.: 174,063

[22] Filed: Jul. 31, 1980

Related U.S. Application Data

[63] Continuation-in-part of Ser. No. 61,624, Jul. 30, 1979, abandoned.

[30] Foreign Application Priority Data

Jul. 30, 1979 [AT] Austria ................................ 5242/79
Oct. 15, 1979 [CH] Switzerland ........................ 9252/79
Jan. 2, 1980 [AT] Austria .................................... 5/80

[51] Int. Cl.[3] ............................................ G03B 31/00
[52] U.S. Cl. .................................................... 352/35
[58] Field of Search ................. 352/35; 248/575, 576, 248/578, 603, 618

[56] References Cited

U.S. PATENT DOCUMENTS

| | | | |
|---|---|---|---|
| 2,043,155 | 6/1936 | Debrie | |
| 2,180,683 | 11/1939 | Laube et al. | 352/35 |
| 3,331,653 | 7/1967 | Blascher et al. | 352/35 |
| 3,659,932 | 5/1972 | Bach | |
| 4,013,352 | 3/1977 | Monroy | 352/35 |
| 4,174,157 | 11/1979 | Gottschalk | 352/35 |

*Primary Examiner*—Monroe H. Hayes
*Attorney, Agent, or Firm*—Blum Kaplan Friedman Silberman & Beran

[57] ABSTRACT

Adjustable mountings for positioning and supporting an inner housing of a movie camera within an outer housing to permit fine adjustment of the position of the inner housing with respect to the outer housing and dampen the noise produced within the outer housing is provided. At least two adjustable mounting means are constructed and arranged to selectively adjustably position and secure the inner housing within the outer housing. Each adjustable mounting means includes resilient sound dampening means. The adjustable mounting means are constructed and arranged to permit the position of the inner housing with respect to the outer housing to be adjusted in at least three directions, each direction being perpendicular with respect to each other.

37 Claims, 20 Drawing Figures

FIG.9b
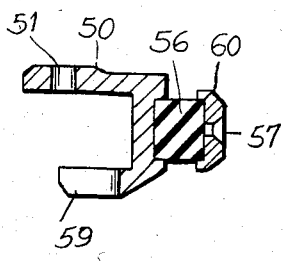
FIG.9c
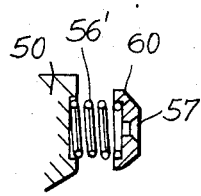
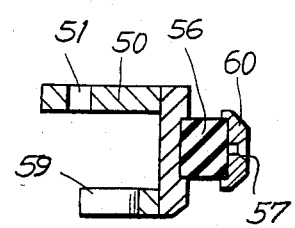
FIG.9d
FIG.9a
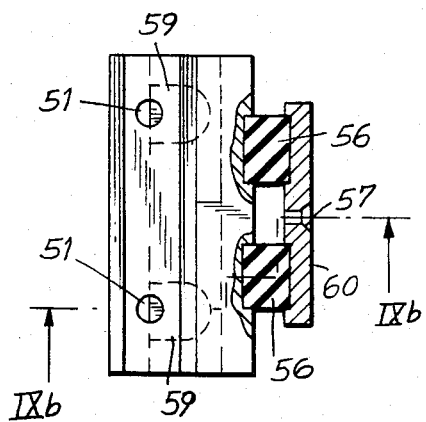

ADJUSTABLE MOUNTINGS FOR A MOVIE CAMERA

CROSS REFERENCE TO RELATED APPLICATIONS

This application is a continuation-in-part application of applicant's U.S. patent application Ser. No. 061,624, filed on July 30, 1979, now abandoned.

BACKGROUND OF THE INVENTION

This invention is directed to adjustably mounting an inner housing within an outer housing of a movie camera and, in particular, to adjustable mountings that selectively and adjustably mount an inner housing within an outer housing in a movie camera for dampening sound produced within the outer housing and permitting adjustment of the positioning of the inner housing in at least three perpendicular directions.

Over the years, different proposals have been made for modifying motion picture cameras of the professional type that are used for producing motion pictures that have sound tracks in an endeavor to reduce the sound generated by the mechanical components of the movie camera. Specifically, in producing motion pictures it is essential that the camera used for such work produce as little sound as possible in order to avoid recording on the sound track unwanted sounds produced by the mechanisms within the motion picture camera. Because most efforts to create less noise have been less than completely satisfactory, for many years it was customary to provide a "blimp" to enclose the motion picture camera and, thus, minimize unwanted sounds produced by the camera. However, the blimp was found to be awkward and cumbersome and could not be readily used unless the camera was mounted on a tripod.

In recent years, however, efforts have been made to provide a portable, lightweight motion picture camera which can be hand-held or balanced on a shoulder and reduces the sound to a level whereby a blimp can be avoided. Such efforts are disclosed in U.S. Pat. Nos. 4,082,436, 4,101,916 and 4,121,886 assigned to Panavision Incorporated, wherein an effort is made to position those mechanisms that generate the most sound on a support plate positioned entirely within the outer housing of the camera and to utilize resilient damping elements for mounting the support plate to the outer housing so that much of the sound generated by the inner housing is damped by the resilient supporting elements. The use of resilient sound damping elements for supporting an inner housing within an outer housing is also disclosed in U.S. Pat. No. 4,013,352.

Although the use of resilient sound damping mounting elements can reduce the noise generated by the camera, it has been found that such mounting elements do not take into account the adjustability of the inner housing of the movie camera with respect to the outer housing of the movie camera and the effect that such adjustability has on the camera optics. Furthermore, the use of sound damping elements in and of themselves, may cause unwanted oscillational displacement or repositioning of the inner housing with respect to the outer housing as the resilient sound dampening material becomes fatigued.

The photographic optics (lenses) of the camera are, as a rule, mounted to the outer housing of the camera and utilize different types of lens and camera mountings to permit the optics to be interchangeable. The mounting most commonly used for 35 mm movie camera is the BNCR mounting. The critical aspect of interchangeable mountings is the focal plane distance and the variation of same as the photographic optics are changed on the camera. Specifically, the focal plane distance, namely, the distance from the support surface of the adaptable fittings of the photographic optics to the plane of the film and the film gate is the factor that is most significant in obtaining a correct focusing of the lens. All photographic optics with a BNCR adjustable fitting must be able to fit on all cameras with a BNCR mounting and must admit of equal focusing no matter what lens or mounting is utilized.

As a practical matter, problems with focusing often arise when lenses of one manufacturer are utilized with a camera by a different manufacturer. Also, focusing problems exist when zoom lenses are to be utilized because the focal distance of the lens during zooming causes the optical center of the image to shift. This shift is caused by the center axis of the interchangeable fittings of the zoom lens not corresponding with the center axis of the film gate. For example, there can be discrepancies between the distance, the vertical and/or the horizontal positioning of the film gate and the optical axis. Such shifting is often caused by the lack of an optimum fit between the optics and the camera mounting as a result of wear on the camera and often results in the film gate being inclined with respect to the optical axis.

Heretofore, efforts to dampen the noise created within the camera housing have not taken into account the adjustment of the focal plane of the camera housing and, hence, have been less than completely satisfactory. Similarly, efforts to assure adjustment of the focal plane of the camera have not taken into account noise dampening of the type that is contemplaed by the instant invention. Accordingly, an adjustable mounting for use with an inner housing having noise producing mechanisms of the camera supported thereon and that dampen the noise transmitted to the outer housing and permits adjustment of the inner housing with respect to the outer housing to optimize focusing thereof is desired.

SUMMARY OF THE INVENTION

Generally speaking, in accordance with the instant invention, an adjustable mounting for fixedly positioning an inner housing of a movie camera within an outer housing so that the inner housing is adjustable with respect to the outer housing and noise therebetween is dampened is provided. Specifically, a film transport mechanism, a film gate mechanism and a shutter mechanism are each supported on the inner housing. At least two adjustable mountings are constructed and arranged to selectively and adjustably position and secure the inner housing within the outer housing. Each adjustable mounting inclues a sound dampening element and the adjustable mountings are constructed and arranged to permit the positioning of the inner housing and the outer housing to be adjusted in at least three distinct directions, each direction being perpendicular with respect to each other.

Accordingly, it is an object of the instant invention to provide an improved adjustable mounting for a movie camera.

A further object of the instant invention is to provide an adjustable mounting for a movie camera for mounting an inner housing within an outer housing and dampening the noise produced by the movie camera.

Still a further object of the instant invention is to provide adjustable mountings for a movie camera that permits an inner housing and an outer housing to be adjustable with respect to each other and that dampens the noise produced by the movie camera.

Still another object of the instant invention is to provide a quieter movie camera wherein interchangeable photographic optics can be utilized without detriment to the focusing of the camera.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 9a and 9b respectively illustrate a top plan view and a sectional view taken along line IXb—IXb of FIG. 9a, of a mounting element of the type depicted in FIG. 8;

FIGS. 9c and 9d respectively illustrate an alternate embodiment of the adjustable mounting element depicted in FIG. 8;

DETAILED DESCRIPTION OF THE PREFERRED EMBODIMENTS

Figure 1:
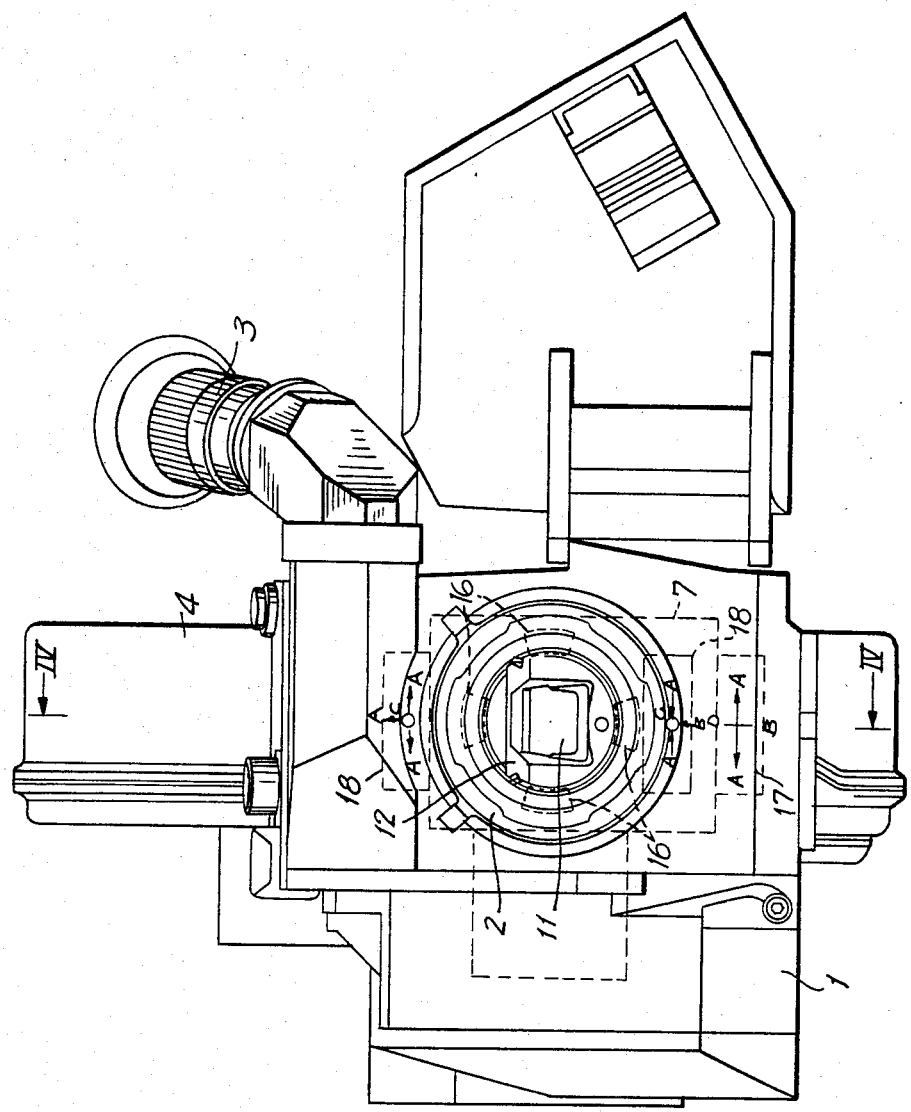
FIG. 1 is an elevational view of a movie camera having adjustable mountings constructed in accordance with the instant invention.
Figure 2:
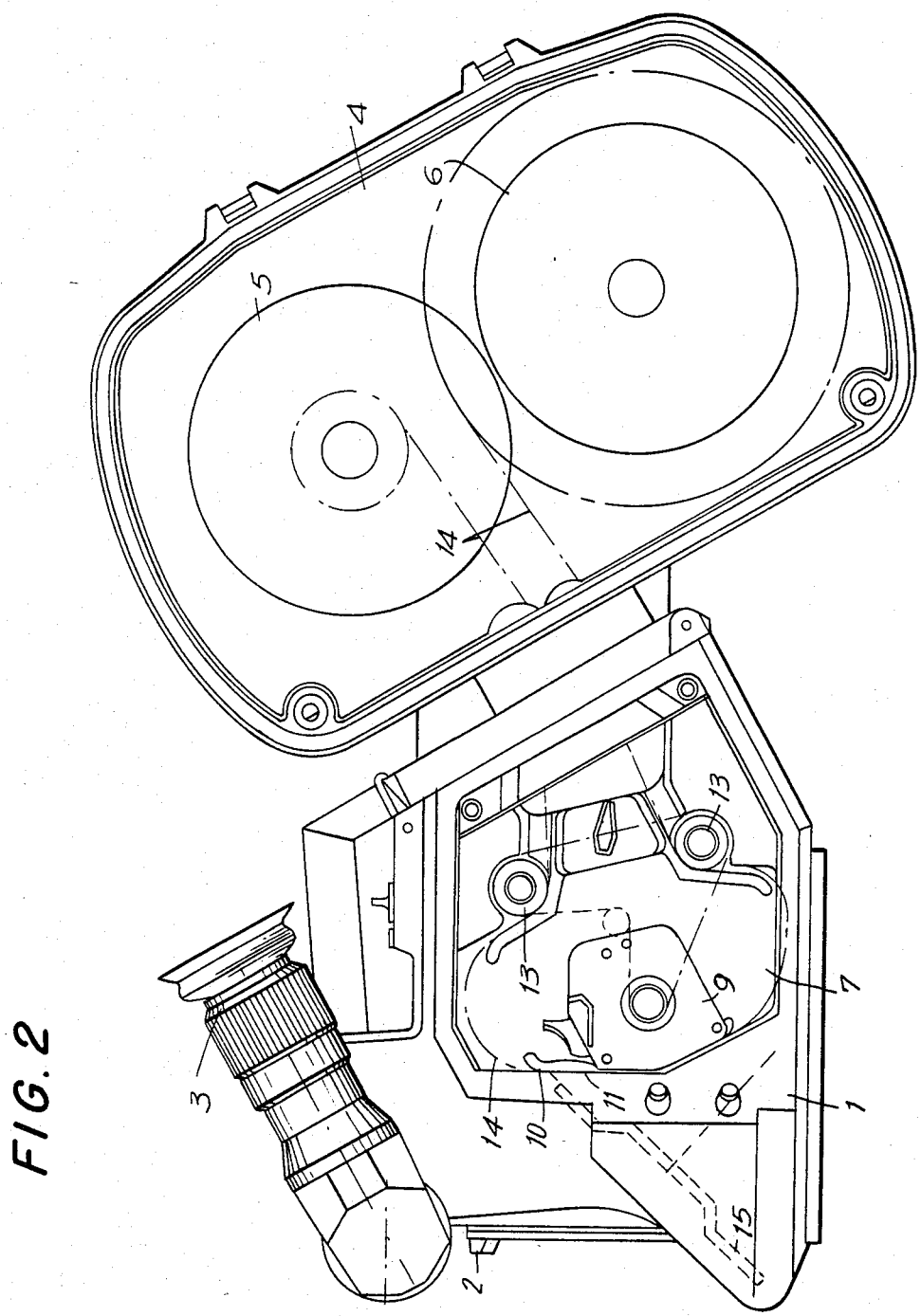
FIG. 2 is a side elevational view of the movie camera depicted in FIG. 1 with the camera door and film magazine door removed.

Reference is now made to FIGS. 1 and 2 of the drawings, wherein an outer camera housing 1, having the photographic optics removed therefrom, is depicted. The housing 1 includes a lens mounting 2 for permitting interchangeable photographic optics to be utilized with the movie camera. The outer housing further supports a view finder eyepiece 3 and a film magazine 4. The film magazine 4 includes a film spool 5 for delivering film to the camera and a film winding spool 6 for returning film to the magazine. The outer camera housing 1 includes a camera door, which is not shown in FIG. 2, in order to illustrate the inner camera 7, which normally is accessible by opening the camera door.

Figure 3:
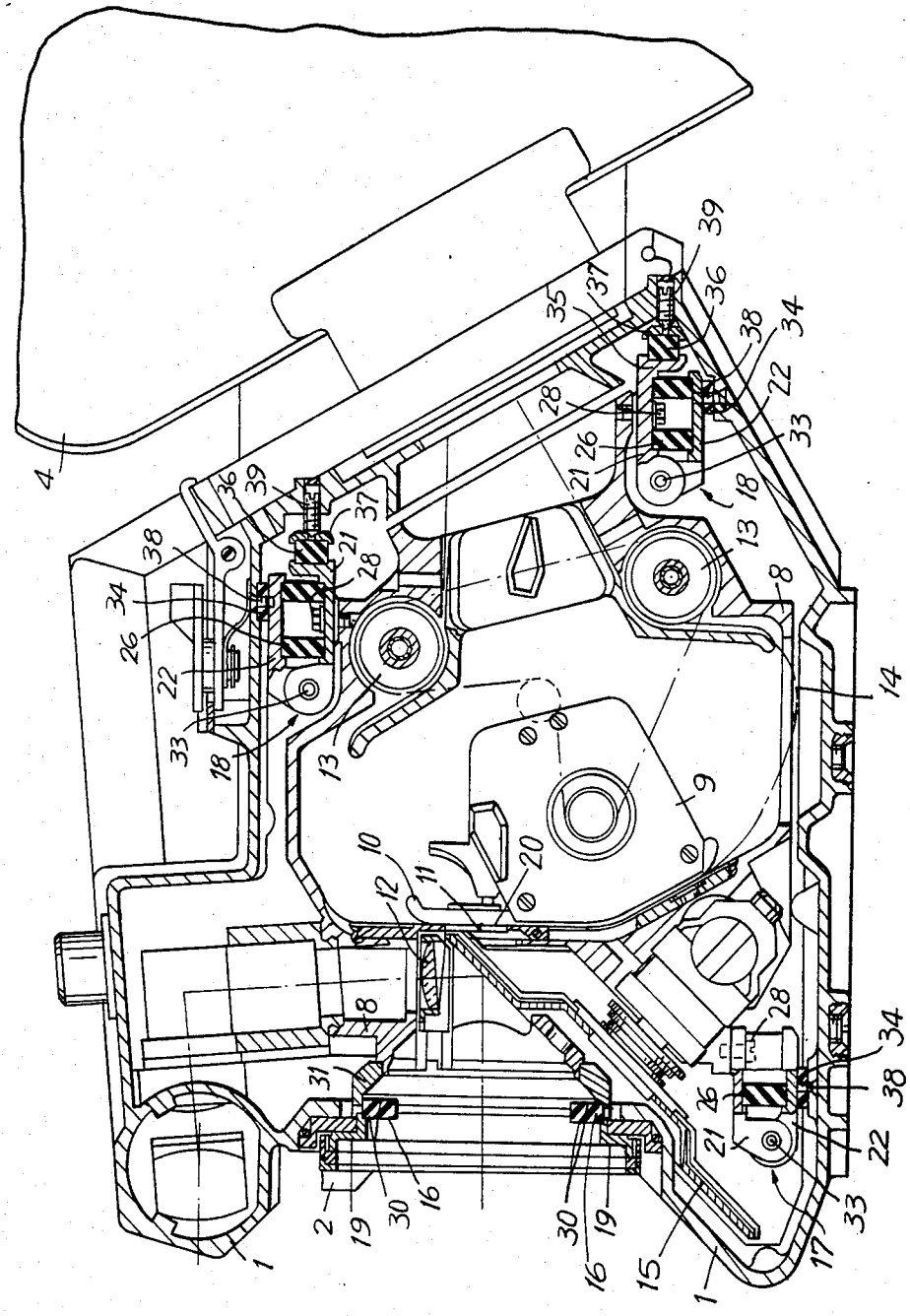
FIG. 3 is a sectional view of a first preferred embodiment taken along line IV—IV of FIG. 1.

With specific reference to FIGS. 2 and 3 of the drawings, the inner camera 7 includes an inner housing 8 for supporting the following components: A film transport mechanism, generally indicated as 9; a ground film plate 10; a film gate 11; a groundglass plate 12; film 14 (illustrated by broken lines); a rotating mirror shutter, generally indicated as 15; and a motor assembly (not shown) for driving the film transport mechanism 9 and the rotating mirror shutter 15. Each of the above components are conventionally found in a movie camera.

The inner housing 8, and each of the camera components supported thereby are mounted within the outer housing 1 by resilient mounting elements, generally indicated as 17 and 18, that are described with greater particularity immediately below. A resilient mounting ring 16, formed of rubber, neoprene or any other resilient material, is positioned intermediate the inner housing 8 and the outer housing 1 at the photographic optics mounting in order to prevent contact between the outer housing and the inner housing of the camera. In addition to resilient ring 16, adjustable mounting elements 17 and 18 selectively adjustably mount the innter camera 7 within the outer camera 1 and provide isolation between the inner housing and the outer housing in order to reduce or dampen the communication of sound from the inner housing to the outer housing.

Adjustable mounting element 17 is adjustable in two directions which are oriented perpendicularly with respect to each other, and adjustable mounting elements 18 are constructed and arranged to be adjustable in three distinct directions, each oriented perpendicularly with respect to each other. As is described in detail below, by utilizing adjustable mounting elements, of the type to which the instant invention is directed, the sound generated by the inner camera can be damped thereby providing for a quieter camera operation and, furthermore, the inner housing can be adjusted with respect to the outer housing to assure that optical focusing of the camera is enhanced.

Figure 4B:
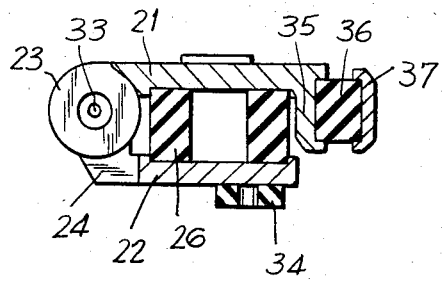
FIGS. 4a, 4b and 4c respectively illustrate a top plan view (partially in section), a side elevational view (partially in section) and a front elevational view of an adjustable mounting element constructed in accordance with a preferred embodiment of the instant invention.
Figure 4C:
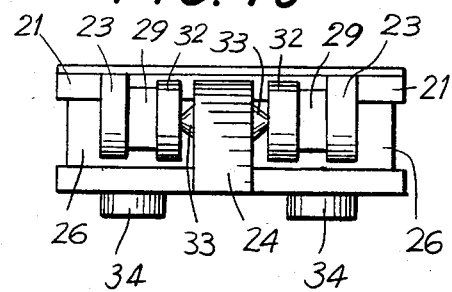

Referring to FIG. 4, the adjustable mounting element 18, illustrated in FIG. 3, is depicted in detail. Adjustable mounting element 18 is comprised of an upper plate 21 including arcuate projections 21 and a bottom plate 22 having an arcuate projection 24. Arcuate projections 23 are curved in the direction of the lower plate 22 and arcuate projection 24 of the lower plate is curved in the direction of the upper plate 21 so that projections 23 and 24 define an overlap when seen in side elevational view to define an opening 25 therebetween. On the inner facing surfaces of the upper plate 21 and the inner facing surface of lower plate 22 are recesses for receiving and positioning a resilient core 26. Tapped openings 27 are further provided within upper plate 21 for receiving a positioning screw 28 therein.

Figure 4A:
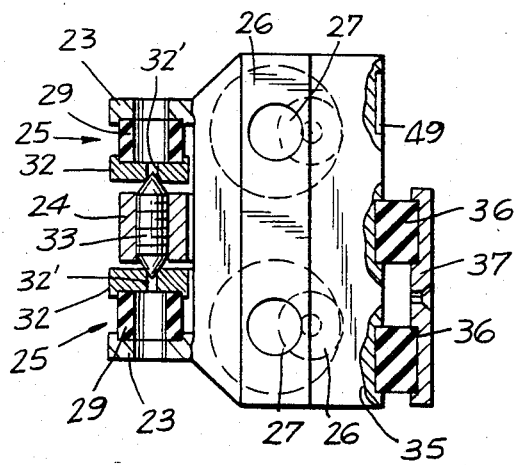

Within the opening 25, defined by the arcuate projections 23 and 24, are positioned resilient cores 29 having a cover plate 32 with a tapered seat 32' and bore formed therein. A screw 33, having opposed tapered points, is screwed into the projection 24 of the lower plate 22 so that both tapered points of the screw 33 are positioned in tapered seats 32' for applying an adjusting force thereto. A screwdriver can thus be inserted through the axis of the core 29 in order to rotate the screw plate 33 and thereby permit an adjustable biasing force to be applied to screw 33. A further hollow cylindrical core 34 of resilient material is eccentrically positioned on the outer surface of lower plate 22 for receiving an adjustment screw 38 with respect to openings 27. Upper plate 21 includes a depending flange 35 for receiving cylindrical cores 36 of resilient material which cores have a cover plate 37 thereon. Although two plates 36 are illustrated in FIG. 4a, additional recesses 49 can be provided in the depending flange 35 for receiving additional cylindrical cores if the dimension of the adjustable element is sufficiently large to require same. Cover plate 37 includes a tapped opening for receiving adjustment screw 39 therein.

The adjustable mounting elements, illustrated in FIG. 4, can be also positioned between the inner camera 7 and outer camera housing 1 so that the upper plate 21 is fixedly connected by means of screws 28 to the inner camera housing 8 and the resilient cores 34 are juxtaposed against the inner side of the outer camera housing. A screw 38 can then be inserted through the outer camera housing 1 and so that the screw 38 and the resilient elements 34 are utilized to apply an adjustable force. Tap holes are provided in the outer camera housing opposite the cover plate 37 through which the screws 39 are anchored to serve as a further means for applying adjustable force, and for engaging with a tapered seat on the cover plate 37. By opening the door (not shown) a screwdriver can engage screw 33 and effect rotation and hence adjustment in the axial direction thereof.

Adjustable mounting elements 17 are only adjustable in two directions (height and width), that are perpendicular with respect to each other, and are identical in every other respect with the adjustable elements 18, illustrated in FIGS. 4 and 5, with the exception of the omission of the cylinders 36, depending flange 35 and cover plate 37.

As illustrated in FIGS. 1 and 3, in order to mount the inner camera housing 8 within the outer camera housing 1, three adjustable mounting elements can be utilized. Two adjustable mounting elements (17 and 18) are positioned below a horizontal plane through the film gate, when viewed in elevation, with the third adjustable elements (18) positioned above the horizontal plane of symmetry of the film gate, when viewed in elevation. It is noted that it is not necessary for the mounting elements to be positioned in any particular orientation with respect to the horizontal plane through the film gate. As illustrated in FIG. 1, however, the position of the adjusting elements in relation to a vertical plane of symmetry through the film gate, in a preferred embodiment, requires the adjustable mounting elements to be aligned and symmetrical with respect to a vertical plane through the film gate.

In the embodiment illustrated in FIG. 3, two of the adjustable elements 18 are adjustable in three directions, each oriented perpendicularly with respect to each other. The adjustable forces can be applied to adjustable mounting elements 18 perpendicular to the horizontal and vertical plane of symmetry of the film gate and perpendicular to the plane of the film gate itself. The adjustable mounting element 17, on the other hand, is adjustable in only two directions that are oriented perpendicularly with respect to each other and perpendicular to the horizontal and vertical planes of symmetry of the film gate.

Accordingly, the inner camera housing 7 is mounted within the outer camera housing 1 in such manner that resilient ring 16 and each of the resilient cores within the adjustable mounting element are under compression by reason of the mountings. Thus, as illustrated in FIG. 3, once the inner camera housing 8 is mounted within the outer housing 1, there is no contact between any metal components of the inner camera housing and any components of the outer housing. If the inner housing and outer housings are formed of metal, the mounting elements 17 and 18 and the resilient ring 16 isolate and, hence, preclude any contact between the inner housing and the outer housing thereby dampening the sound generated by the components mounted on the inner housing from being transmitted to the outer camera housing. Thereafter, as long as at least one adjustable mounting assembly 18 is utilized, the inner housing can be adjusted in three distinct orientations, each orientation being perpendicular with respect to each other, to thereby adjust the focal plane distance and the position of the film gate in order to optimize the referencing of the photographic optics. Thus, mere rotation of screws 33, 38 and 39 of the adjustable mounting element 18 will permit three-way adjustment of the inner housing with respect to the outer housing. Moreover, because of the manner in which the inner housing is positioned within the outer housing by resilient sound dampening materials, the turning of positioning screws 33, 38 and 39 will effect displacement of the inner housing within the outer housing without simultaneously actuating an opposing adjusting member and thereby preventing any play or backlash that would normally be created by such a resilient mounting assembly.

Accordingly, the instant invention is particularly characterized by adjustable mounting elements that permit the housing of the inner camera 7 to be finely adjusted either after assembly of the camera or at the time that the photographic optics are changed. Moreover, the orientation of the film gate, when the film gate is positioned at an incline with respect to the optical access of the photographic optics, can be corrected by adjustment of positioning screws 33, 38 and 39, thereby providing adjustable sound dampening mounting elements. Although the resilient cores 34 and 36 are illustrated in the preferred embodiment of the instant invention, if resilient cores 34 and 36 are omitted and the lower plate 22 is positioned directly in contact with the outer camera housing 1, the adjustable screw 39 can be engaged directly in the depending flange 35 of the upper plate.

Figure 5B:
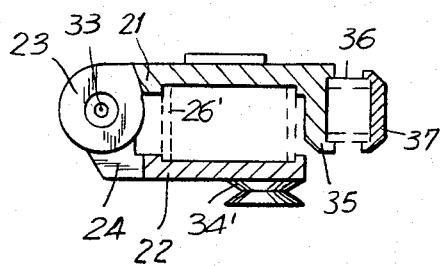
FIGS. 5a, 5b and 5c respectively illustrate a top plan view (partially in section), a side elevational view (partially in section) and a front elevational view of a mounting assembly constructed in accordance with an alternate embodiment of the instant invention.
Figure 5C:
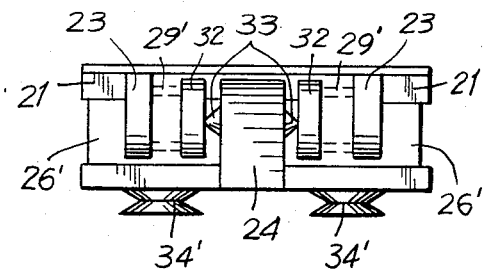
Figure 5A:
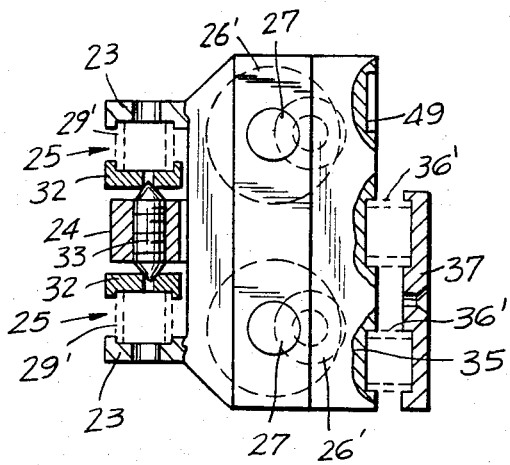

As noted above, the cylindrical cores are formed of resilient plastics such as polyurethane or synthetic rubber. Furthermore, natural rubber can also be utilized. Moreover, the instant invention is not limited to cylindrical cores and, instead, helical springs or plate springs can be utilized in lieu thereof. FIG. 5 illustrates the manner in which springs 26', 29', 34' and 36' can be utilized to replace the cylindrical resilient cores, illustrated in FIGS. 4a through 4c. In every other respect, like reference numerals are utilized in FIGS. 5a through 5c to identify like elements described above.

Figure 6:
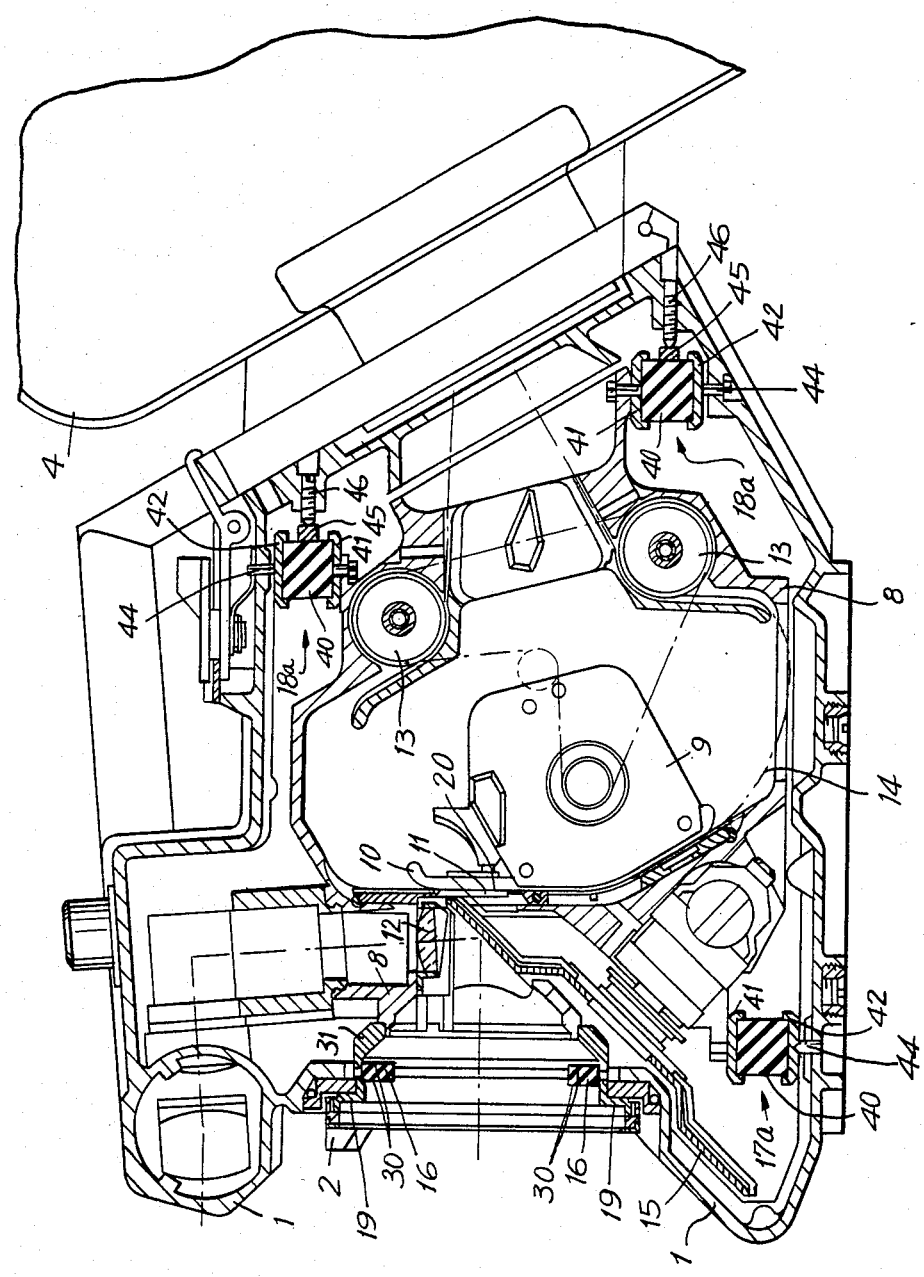
FIG. 6 is a sectional view of a second embodiment of the instant invention, taken along line IV—IV of FIG. 1.
Figure 7B:
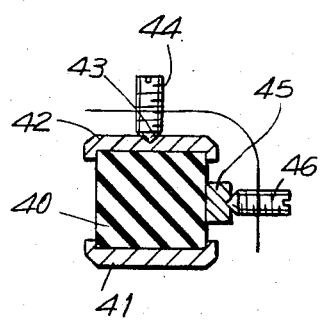
FIGS. 7a, 7b and 7c respectively illustrate a top plan view, side elevational view (partially in section), and front elevational view (partially in section) of the adjustable mounting elements illustrated in FIG. 6.
Figure 7C:
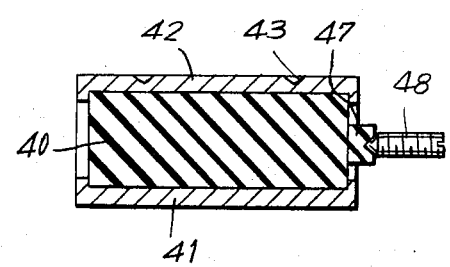
Figure 7A:
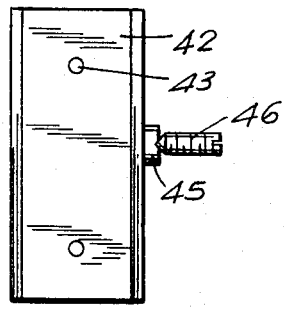

Reference is now made to FIGS. 6 and 7 wherein a further embodiment of the instant invention is depicted, like reference numerals being utilized to denote like elements described above. The adjustable mounting elements 18a are adjustable in three directions oriented perpendicularly with respect to each other and adjustable mounting elements 17a are adjustable by means of two adjusting forces oriented perpendicularly with respect to each other, the adjustable mounting elements 18a and 17a being positioned in the same manner discussed above with respect to FIG. 3. Referring to FIGS. 7a through 7c, the adjustable mounting elements are comprised of a single resilient block 40 supporting an outer plate 42 and an inner plate 41. The inner plate 41 is fixedly secured to the housing 8 of the inner camera. The outer plate 42 includes cone shaped detents 43 for receving the adjusting screws 44 that are screwed through the outer camera housing 1. At a first side, the resilient block 40 includes a further spacer 45 for receiving a second adjusting screw 46 which is screwed through the outer camera housing 1 and arranged perpendicularly with respect to the vertically oriented adjustment screw 44. On a further side, the resilient block 40 has a further detent 47 for receiving an adjustable screw 48 screwed through the outer camera housing 1, adjustable screw 48 being oriented perpendicularly with respect to screws 44 and 46. Thus, each of the mounting elements 18a, illustrated in FIG. 6, are adjustable in three directions and mounting element 17 is adjustable in only two directions.

Figure 8:
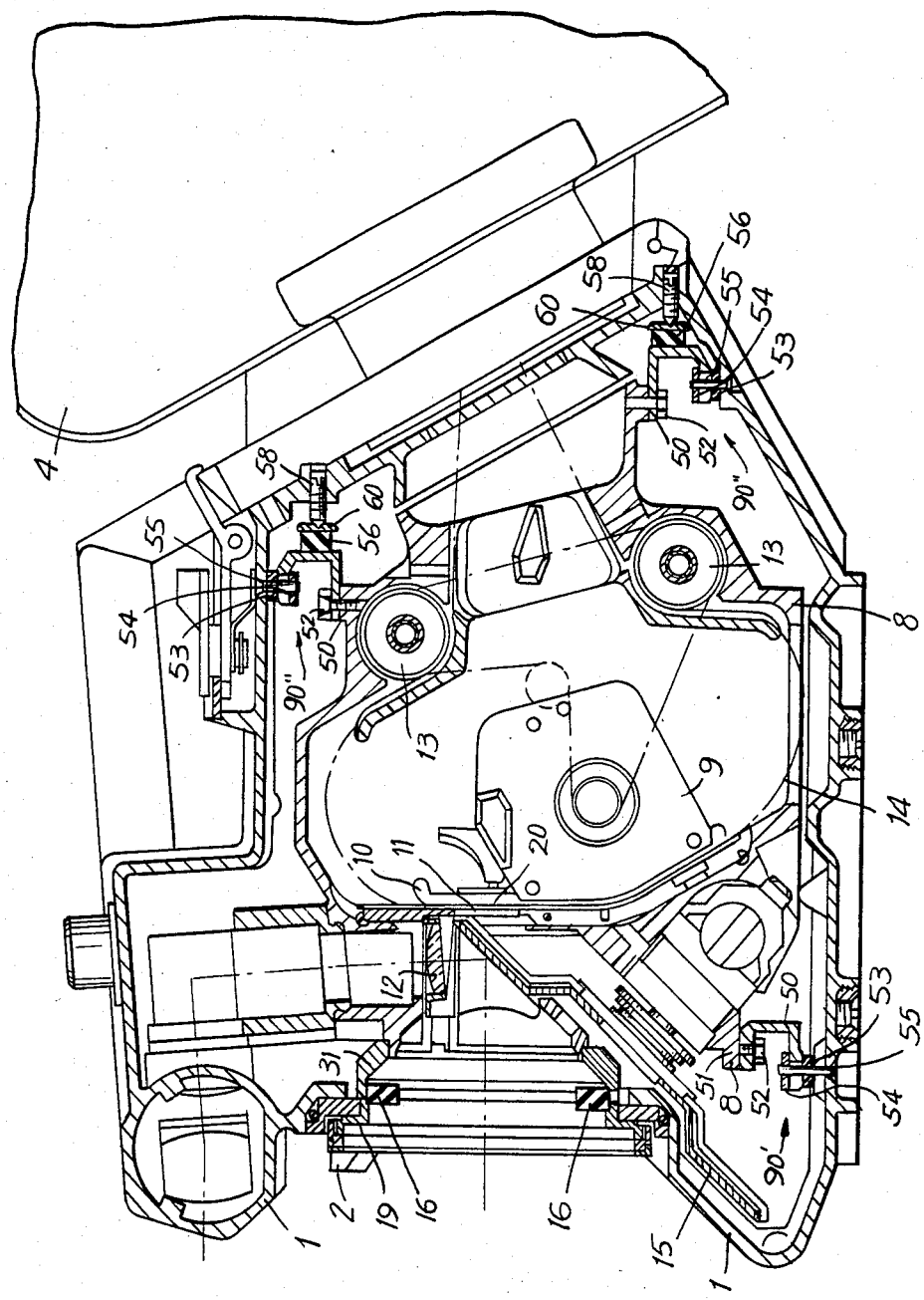
FIG. 8 is a sectional view of a third embodiment of the instant invention taken along line IV—IV of FIG. 1.

Reference is also made to FIGS. 8 and 9 wherein a further type of adjustable mounting element, constructed in accordance with the instant invention is depicted, like reference numerals being utilized to denote like elements. Once again, a total of three adjustable mounting elements are utilized and are arranged in the same manner described above with respect to FIGS. 2 and 3. Of the three adjustable mounting elements one, namely, the adjustable mounting element 90', is positioned below the camera mounting 2 and is adjustable by means of an adjustable force that is applied perpendicular to the horizontal plane of symmetry of the film gate. The other two adjustable elements 90" are adjustable by means of two adjustable forces perpendicular to the horizontal plane of symmetry of the film gate and to the plane of the film gate (plane of the film), respectively. Such an adjustable element 90" is adjustable by means of two adjustable forces that are perpendicular to each other and include member 50, a U-shaped cross section being made in either one piece (FIG. 9b) or in separate pieces (FIG. 9c). One leg is formed with openings 51 for permitting same to be fixedly secured to housing 8 of the inner camera by adjustment screws 52. The other arm of the U-shaped profile piece 50 is supported on the outer housing of the motion picture camera with an intermediately placed cylindrical core 53 of resilient material. An adjustment screw 55 is inserted through the outer camera housing 1 of the motion picture camera and the hollow cylindrical body 53 into a washer 54 and applies the adjustable force thereto. Recess 59 simplifies the positioning of the U-shaped sectional piece during assembly and recesses the midsection of the U-shaped profile piece to receive a solid resilient body 56, which has positioned at the free end thereof a cover plate 60 with a cone shaped opening 57 for receiving a further adjustment screw 58 that is inserted through the outer housing 1 of the motion picture camera. The adjustable screw 58 is positioned perpendicular to the adjustable screw 55. The resilient ring 16 and the cylindrical bodies 53 and 56 can thus be formed of polyurethane base plastic, rubber or, in the case of the resilient body 56, can be springs 56' of the type illustrated in FIG. 9d. Construction of the adjustable elements 90' is the same as the construction of the adjustable element 90" with the single exception that the resilient body 56 and cover plate 60 are omitted. One advantage that is realized by utilizing adjustable mounting elements 90' and 90", illustrated in FIGS. 8 and 9a through 9d, is that all of the pieces can be formed to be flexible, per se, by selecting appropriate materials for the U-shaped profile piece and selecting a predetermined distance between the legs and the points of attachment of the legs.

Figure 10:
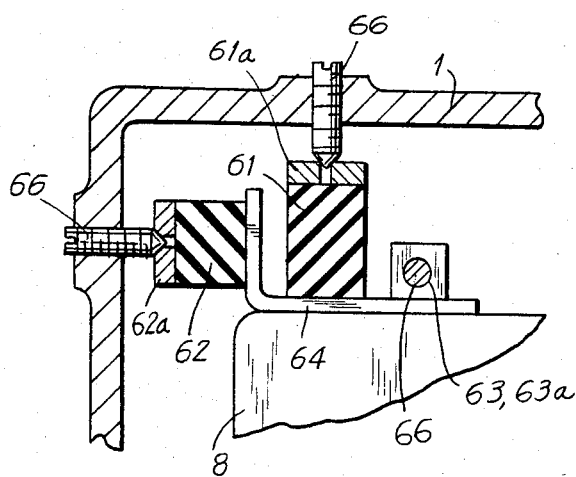
FIG. 10 is still a further embodiment of an adjustable mounting element constructed in accordance with the instant invention.

Reference is made to FIG. 10, wherein a further embodiment of an adjustable mounting element, constructed in accordance with the instant invention for mounting an inner housing 1 to an outer housing 8, is depicted. The adjustable mounting element is comprised of three separately arranged resilient blocks 61, 62 and 63 which are all mounted on an angled bearing plate 64. Bearing plate 64 is secured to the inner housing 8 of the inner camera and metal support pieces 61a, 62a and 63a are each secured to the end of the cylindrical block with tapped openings therein for receiving adjustable screws 66 that pass through the outer housing 1 and into tapped openings to thereby permit adjustment in three directions perpendicular with respect to each other.

Figure 11:
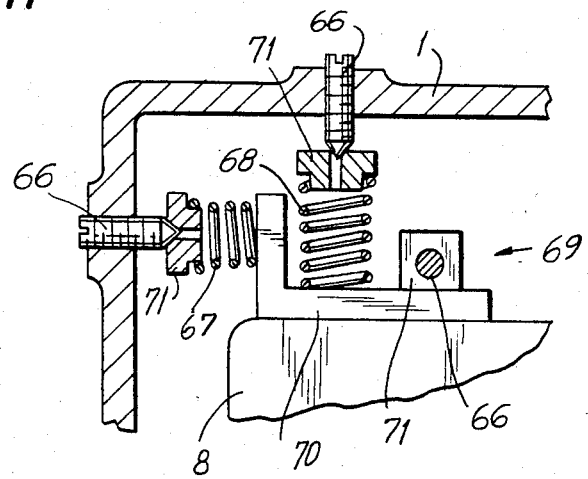
FIG. 11 is still another embodiment of an adjustable mounting element constructed in accordance with the instant invention.

Reference is also made to FIG. 11 wherein an alternate embodiment of the mounting element, illustrated in FIG. 10, is depicted, like reference numerals being utilized to denote like elements depicted in FIG. 10. It is noted, however, that in lieu of resilient blocks 61, 62 and 63, illustrated in FIG. 10, spiral springs 67, 68 and 69 are supported on bearing plate 70 in order to provide resilient adjustment in three directions, each perpendicular with respect to each other, in the same manner discussed above with respect to the mounting assembly depicted in FIG. 10. Thus, the mounting plate 71 is coupled to the free end of each spring and have the tapped recess therein for receiving the adjustment screws 66 to thereby define adjustable mountings for the housing 8 of the inner camera 7.

Accordingly, the instant invention is particularly characterized by the use of adjustable mounting elements that dampen the noise between the inner housing and the outer housing and permit fine adjustment of the inner housing with respect to the outer housing, either during assembly of the movie camera or when interchangeable lenses are utilized therewith. In a preferred embodiment of the instant invention, resilient materials such as neoprene, synthetic or natural rubber, are utilized as the resilient members in order to increase the sound dampening quality of the resilient mounting elements of the instant invention.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a movie camera including an outer housing and an inner housing, film transport means supported on said inner housing, shutter means supported on said inner housing and film gate means supported on said inner housing, the improvement comprising at least two adjustable mounting means constructed and arranged to selectively adjustably position and secure said inner housing within said outer housing, each said adjustably mounting means being mounted to said inner housing and to said outer housing for acoustically isolating said inner housing from said outer housing, said adjustable mounting means including sound dampening means for acoustically isolating said inner housing from said outer housing, at least a first said adjustable mounting means being constructed and arranged to permit said positioning of said inner housing to be adjusted with respect to said outer housing in at least three directions, each direction being perpendicular with respect to each other.

2. A movie camera, as claimed in claim 1, wherein said outer housing includes a photographic optic mounting means for receiving photographic optics, said first adjustable mounting means being positioned with respect to said film gate means for adjusting the position of said film gate with respect to said photographic optic mounting means and said photographic optics to be received thereby.

3. A movie camera, as claimed in claim 2, wherein a resilient mounting means is positioned intermediate said inner housing and said outer housing at a position proximate to said photographic optics mounting means.

4. A movie camera, as claimed in claim 3, wherein said outer housing includes an optical opening at said photographic optics mounting means, said opening being in axial registry with said film gate means, said photographic optics mounting means surrounding said opening in said outer housing and said resilient mounting means also surrounding said opening in said outer housing.

5. A movie camera, as claimed in claim 4, wherein said resilient mounting element is a resilient circular ring, said ring being disposed in abutment between said inner housing and said outer housing at said opening in said outer housing.

6. A movie camera, as claimed in claim 3, wherein said first adjustable mounting means is adapted to provide adjustment in three directions, said second adjustable mounting means being constructed and arranged to provide positioning of said inner camera housing with respect to said outer housing in at least two directions, each direction being perpendicular with respect to each other.

7. In a movie camera, as claimed in claims 1 or 3, each of said adjustable mounting means including a first structural member secured to said inner housing, a second structural member adjustably secured to said outer housing, and at least one resilient means secured intermediate said first and second structural members for permitting said first and second structural members to be resiliently biased toward each other.

8. A movie camera, as claimed in claim 7, and including a first adjustment means secured to said outer housing and to said second structural member for adjustably positioning said first and second structural members with respect to each other, whereby said inner housing and said outer housing are adjusted with respect to each other.

9. A movie camera, as claimed in claim 8, including second adjustment means coupled to at least one of said first structural member and second structural member, said structural members being adapted to be adjusted to effect displacement between said first structural members and said second structural members in a direction perpendicular to said first predetermined direction of adjustment defined by said first adjustment means.

10. A movie camera, as claimed in claim 9, wherein a second resilient means is positioned intermediate said first and second resilient means preventing contact between said first structural member and said second structural member in said second direction to thereby assure that a variable adjustment and biasing force is applied in said second perpendicular direction by said second adjustment means.

11. A movie camera, as claimed in claim 10, wherein said first structural member includes a depending structural member that supports a third resilient means thereon, and adjustment means adjustably coupled to said outer housing and to said third resilient means for applying an adjustment force to said first structural member and hence an adjustment of said inner housing to said outer housing in a third direction perpendicular to said first predetermined direction and said second predetermined direction.

12. A movie camera, as claimed in claim 11, wherein said third adjustment means includes a screw secured in said outer housing and a cover plate abutting said third resilient means for receiving said screw and applying a biasing force against said third resilient means in said third direction.

13. A movie camera, as claimed in claim 1, 2 or 3, wherein at least three adjustable mounting means are provided and at least one of said adjustable mounting means is adjustable in at least three directions, each being perpendicular with respect to each other.

14. A movie camera, as claimed in claim 13, wherein each of said adjustable mounting means are positioned symmetrically with respect to a plane that bisects said film gate when said film gate is viewed in front elevation (FIG. 1).

15. A movie camera, as claimed in claim 14, wherein at least one of said adjustable mounting means is above said film gate, in elevation, when the film gate is viewed in front elevation (FIG. 1).

16. A movie camera, as claimed in claims 1, 2 or 3, wherein at least three adjustable mounting means are provided and at least two of said adjustable mounting means are adjustable in at least three directions, each direction being oriented perpendicularly with respect to each other.

17. A movie camera, as claimed in claim 16, wherein each of said adjustable mounting means are positioned symmetrically with respect to an imaginary plane that bisects the film gate when said film gate is viewed in front elevation.

18. A movie camera, as claimed in claim 17, wherein at least one of said adjustable mounting elements is above said film gate, in elevation, when said film gate is viewed in front elevation.

19. In a motion picture camera including an outer housing and an inner housing, a film transport means supported on said inner housing, shutter means supported on said inner housing and film gate means supported on said inner housing, the improvement comprising at least two adjustable mounting means constructed and arranged to selectively and adjustably position and secure said inner housing within said outer housing each said adjustable mounting means being mounted to said inner housing and to said outer housing and including sound dampening means for acoustically isolating said inner housing from said outer housing, each said mounting means being constructed and arranged to provide adjustment of said inner housing with respect to said outer housing in at least two directions that are perpendicular with respect to each other.

20. A movie camera, as claimed in claim 19, wherein at least one of said perpendicular directions defined by a first adjustable mounting means is perpendicular to said first and second perpendicular directions of said second adjustable mounting means.

21. A movie camera, as claimed in claim 20, wherein said outer housing includes a photographic optic mounting means for receiving photographic optics, said first adjustable mounting means and said second adjustable mounting means being positioned with respect to said film gate means for adjusting the position of said film gate with respect to said photographic optic mounting means and said photographic optics to be received thereby.

22. A movie camera, as claimed in claim 21, wherein a resilient mounting means is positioned intermediate said inner housing and said outer housing at a position proximate to said photographic optics mounting means.

23. A movie camera, as claimed in claim 22, wherein said outer housing includes an optical opening at said photographic optics mounting means, said opening being in axial registry with said film gate means, said photographic optics mounting means surrounding said opening in said outer housing and said resilient mounting means also surrounding said opening in said outer housing.

24. A movie camera, as claimed in claim 23, wherein said resilient mounting element is a resilient circular ring, said ring being disposed in abutment between said inner housing and said outer housing at said opening in said outer housing.

25. In a movie camera, as claimed in claims 20 or 22, each of said adjustable mounting means including a first structural member secured to said inner housing, a second structural member adjustably secured to said outer housing, and at least one resilient means secured intermediate said first and second structural members for permitting said first and second structural members to be resiliently biased toward each other.

26. A movie camera, as claimed in claim 25, and including a first adjustment means secured to said outer housing and to said second structural member for adjustably positioning said first and second structural members with respect to each other, whereby said inner housing and said outer housing are adjusted with respect to each other.

27. A movie camera, as claimed in claim 26, including second adjustment means coupled to at least one of said first structural member and second structural member of said first adjustable positioning means, said structural members being adapted to be adjusted to effect displacement therebetween in a direction perpendicular to said first predetermined direction of adjustment defined by said first adjustment means.

28. A movie camera, as claimed in claim 27, wherein said second resilient means are positioned intermediate said first and second structural members of said first adjustable mounting means in said second direction, said second resilient means preventing contact between said first structural member and said second structural member in said second direction to thereby assure that a variable adjustment and biasing force is applied in said second perpendicular direction by said second adjustment means.

29. A movie camera, as claimed in claim 25, wherein said first structural member of said second adjustable mounting means includes a depending member that supports a third resilient means thereon, and adjustment means adjustably coupled to said outer housing and to said third resilient means for applying an adjustment force to said first structural member and hence an adjustment of said inner housing to said outer housing in a third direction perpendicular to said first direction and said second direction provided by said first adjustable mounting means.

30. A movie camera, as claimed in claim 29, wherein said third adjustment means includes a screw secured in said outer housing and a cover plate abutting said third resilient means for receiving said screw and applying a biasing force against said third resilient means in said third direction.

31. A movie camera, as claimed in claim 19, wherein at least three adjustable mounting means are provided and each of said adjustable mounting means is adjustable in at least two perpendicular directions.

32. A movie camera, as claimed in claim 19, wherein each of said adjustable mounting means are positioned symmetrically with respect to a plane that bisects said film gate when said film gate is viewed in front elevation.

33. A movie camera, as claimed in claim 19, wherein at least one of said adjustable mounting means is above said film gate, in elevation, when the film gate is viewed in front elevation (FIG. 1).

34. An adjustable mounting for use in a movie camera having an outer housing and an inner camera comprising in combination a first structural member adapted to be secured to an inner camera, and at least a first noise dampening resilient means disposed against said first structural member, a second structural member positioned in abutment with said first resilient means so that said resilient means is secured imtermediate said first structural member and second structural member, and first adjustment means secured to said outer housing and engaging said second structural member and affecting adjustment between said first structural member and a second structural member in a first direction whereby an inner housing and said outer housing are adjusted with respect to each other in said first direction and second adjustment means engaging said first structural member for adjusting said first structural member in a direction perpendicular to said first predetermined direction of adjustment defined by said first adjustment means.

35. An adjustable mounting, as claimed in claim 34, wherein said second adjustment means includes said second structural member and resilient sound dampening means positioned intermediate said first and second structural members to prevent contact between said first structural member and said second structural member in a second direction to thereby assure that a variable adjustment and biasing force is applied in said second perpendicular direction by said second adjustment means.

36. An adjustable mounting, as claimed in claim 35, wherein said first structural member further supports a third resilient means thereon, and third adjustment means adjustably coupled to said outer housing and to said third resilient means for applying an adjustment force to said first structural member and hence an adjustment of said inner housing to said outer housing in a third direction perpendicular to said first direction and said second direction.

37. An adjustable mounting, as claimed in claim 36, wherein said third adjustment means includes a screw secured in said outer housing and a cover plate abutting said third resilient means for receiving said screw and applying a biasing force against said third resilient means in said third direction.

* * * * *